United States Patent [19]
Watanabe et al.

[11] Patent Number: 4,974,158
[45] Date of Patent: Nov. 27, 1990

[54] MULTIPLE SEQUENTIALLY TRANSFERRABLE STACKPOINTERS IN A DATA PROCESSOR IN A PIPELINING SYSTEM

[75] Inventors: Yukari Watanabe; Toyohiko Yoshida; Masahito Matsuo; Yuichi Saito; Toru Shimizu, all of Itami, Japan

[73] Assignee: Mitsubishi Denki Kabushiki Kaisha, Tokyo, Japan

[21] Appl. No.: 506,498

[22] Filed: Apr. 9, 1990

Related U.S. Application Data

[63] Continuation of Ser. No. 198,421, May 25, 1988, abandoned.

[30] Foreign Application Priority Data

Jun. 10, 1987 [JP] Japan ............................. 62-145852

[51] Int. Cl.[5] .............................................. G06F 9/38
[52] U.S. Cl. ................................. 364/200; 364/244.3; 364/231.8
[58] Field of Search ... 364/200 MS File, 900 MS File

[56] References Cited

U.S. PATENT DOCUMENTS 4,025,771  5/1977  Lynch ................................ 364/200
4,270,181  5/1981  Tanakura ........................... 364/200
4,697,233  9/1987  Scheuneman et al. ............. 364/200

OTHER PUBLICATIONS

"Microcomputer Architecture and Programming", John F. Wakerly (1981), John Wiley & Sons.

Primary Examiner—Lawrence E. Anderson
Attorney, Agent, or Firm—Townsend and Townsend

[57] ABSTRACT

This invention relates to a data processor with pipelining system, which is provided with at least two stages having working stackpointer respectively, and so constructed that each stage can independently refer to the working stackpointer corresponding to each stage, and each working stackpointer corresponding to each stage is renewed synchronizing with pipelining processing, so that when execution of a plural instructions including designation of operands under stack-push addressing mode and stack-pop addressing mode, result of address calculation executed at the address calculation stage is sequentially transferred to corresponding working stackpointers synchronizing with the transfer of instructions through the stages of pipeline, thereby being possible for the data processor to smoothly execute pipelining process.

4 Claims, 4 Drawing Sheets

Fig. 1
Prior Art
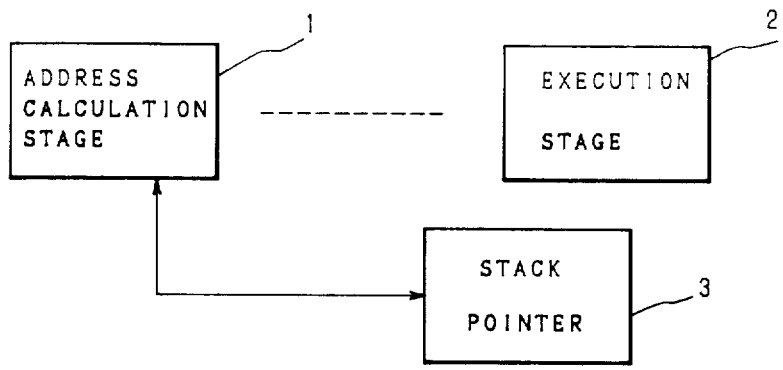
Fig. 2 (a)
Prior Art
| INSTRUCTION 11 | PUSH Rg0 |
|---|---|
| INSTRUCTION 12 | PUSH Rg1 |
Fig. 2 (b)
Prior Art
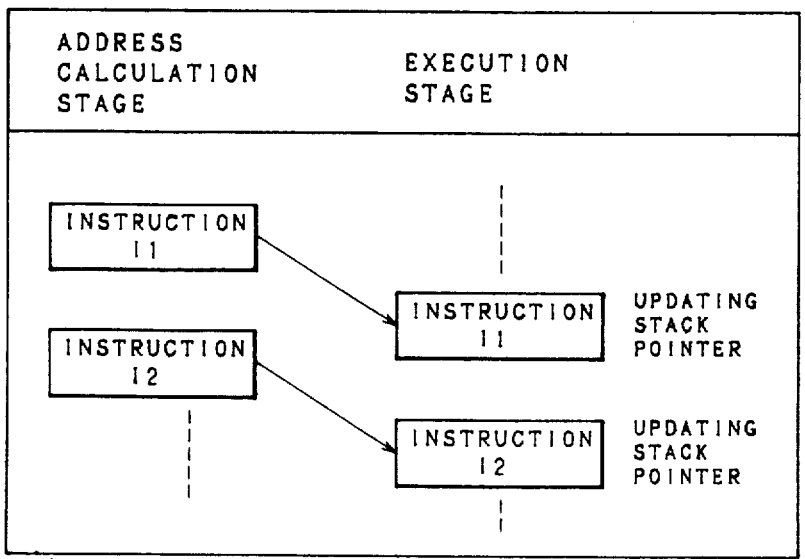

Fig. 4 (a)
| INSTRUCTION 11 | PUSH Rg0 |
| --- | --- |
| INSTRUCTION 12 | PUSH Rg1 |
Fig. 4 (b)
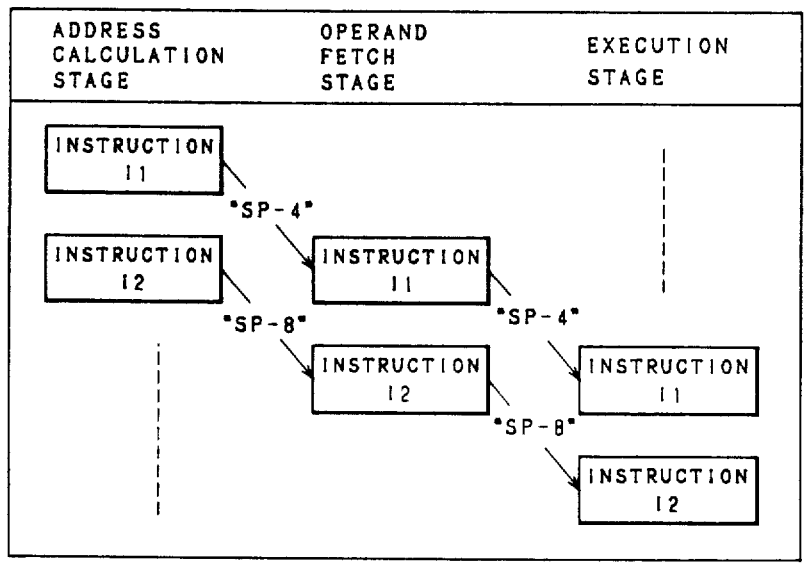
Fig. 5 (a)
| INSTRUCTION 11 | POP Rg0 |
| --- | --- |
Fig. 5 (b)
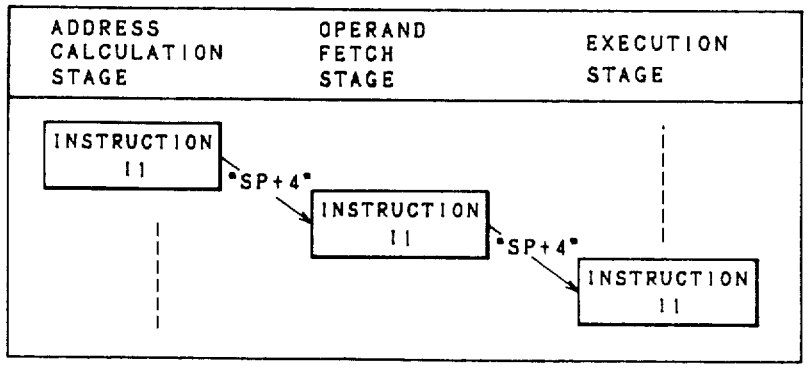

MULTIPLE SEQUENTIALLY TRANSFERRABLE STACKPOINTERS IN A DATA PROCESSOR IN A PIPELINING SYSTEM

This is a continuation of application Ser. No. 07/198,421, filed May 25, 1988, now abandoned.

BACKGROUND OF THE INVENTION

1. Field of the Invention

The present invention relates to a data processor such as a microprocessor which is provided with pipelining system for processing instructions and capable of accessing operand of instruction under stack-push addressing mode and stack-pop addressing mode.

2. Description of the Prior Art

FIG. 1 is the schematic diagram of pipelining system of a conventional data processor.

Referring to FIG. 1, the reference numeral 1 denotes an address calculation stage, 2 an execution stage, and 3 a stackpointer, respectively.

FIG. 2 is the schematic diagram explaining operations of the pipelining system shown in FIG. 1. FIG. 2 (a) denotes instructions and 2 (b) a pipelining process when executing those instructions shown in FIG. 2 (a).

Conventionally, when executing instructions including designation of operands under stack-push addressing mode and stack-pop addressing mode, it is assumed that the stack-pointer 3 is renewed simultaneously with the calculation of the operand address. However, when executing those instructions mentioned above by applying pipelining process, even if a new stackpointer value is calculated at the address calculation stage 1, the preceding instruction being executed at the execution stage 2 may refer to the past stack-pointer value. To prevent this, the present instruction is obliged to stand by itself at the address calculation stage 1 until the preceding instruction passes through the execution stage 2.

For example, operations of the conventional pipelining system when consecutively executing two instructions including the designation of operands under stack-push addressing mode ("PUSH" shown in FIG. 2 (a)) is described below.

Assume that the stackpointer value before executing an instruction I1 is SP, first, at the address calculation stage 1, an operand address of the instruction I1 is calculated, and as a result, the address "SP-4" is outputted. Nevertheless, since another instruction preceding the instruction I1 may access the stackpointer 3 at the same time, actually, the value of the stackpointer 3 cannot be renewed. Actually, this value can be renewed simultaneously with the executing of the instruction I1 at the execution stage 2. Furthermore, since the operand address of an instruction I2 following instruction I1 cannot be calculated before the new stackpointer value "SP-4" generated by the instruction I1 is actually written into the stackpointer, calculation of the operand address of the instruction I2 is executed after renewing the content of the stackpointer 3.

As mentioned above, in conjunction with the pipelining process executed by any conventional data processor, when executing a plurality of instructions including the designation of operands under stack-push addressing mode and stack-pop addressing mode, actually, only one of those instructions can be operated, and as a result, any conventional data processor still cannot achieve the eventual object of pipelining process for improving the throughput by executing a number of instructions in parallel using a plurality of function stages.

SUMMARY OF THE INVENTION

The invention overcomes those problems mentioned above by providing a novel data processor which allows pipeling process to fully and efficiently be executed without lowering throughput even when executing a plurality of instructions including the designation of operands under the stack-push addressing mode and stack-pop addressing mode.

The data processor related to the invention is provided with at least two operational stages which constitute a pipelining system with working stackpointers respectively, where each of these working stackpointers corresponding to each operational stage is independently referable and renewable synchronizing with the operating of pipelining process. For example, this constitution allows the results of address calculation executed at the address calculation state to be written into the corresponding stackpointer when executing a plurality of instructions including the designation of operands under stack-push and stack-pop addressing mode. Then, the value delivered to the stackpointer is sequentially written into stackpointers corresponding to respective operational stages in accordance with the sequential flow of instructions among each operational stage through the pipelining process. When rewriting the value of corresponding stackpointer in the execution stage, all the values of stackpointers corresponding to other operational stages are simultaneously rewritten.

The above and further objects and features of the invention will more fully become apparent from the detailed description in reference to the accompanying drawings that follow.

BRIEF DESCRIPTION OF THE DRAWINGS

FIG. 1 is a schematic diagram of a conventional pipelining system;

FIG. 2 is a simplified schematic diagram explaining operations of the conventional pipelining system shown in FIG. 1, where (a) denotes instructions and (b) the pipelining process;

FIGS. 4 through 7 are respectively schematic diagrams explaining the pipelining processes of the data processor when executing a plurality of instructions, where (a) denotes instructions, (b) pipeline processings respectively.

DESCRIPTION OF THE PREFERRED EMBODIMENTS

Referring now more particularly to the accompanying drawings, a preferred embodiment of the data processor related to the invention is described below.

Figure 3:
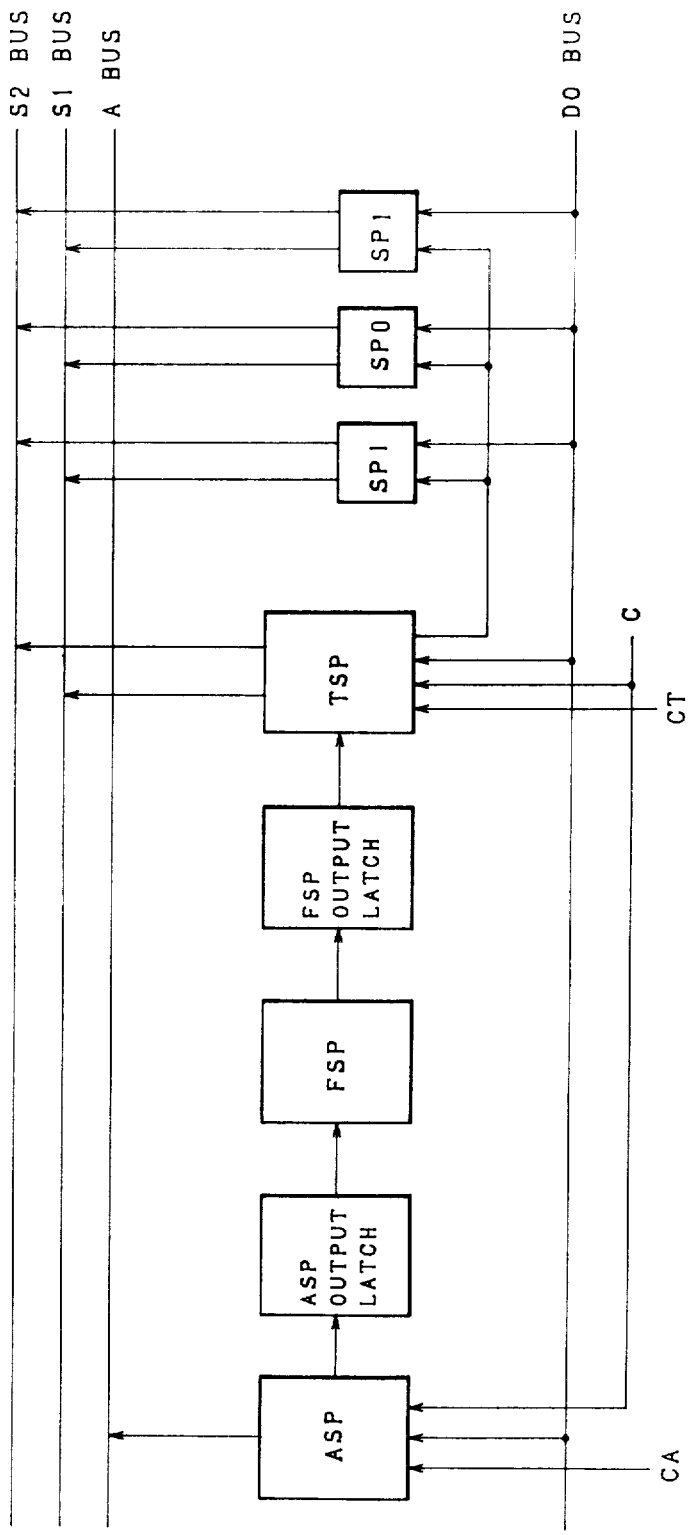
FIG. 3 is a schematic diagram of the essential constituents of the data processor related to the invention.

FIG. 3 is the schematic diagram of the essential constituents of the data processor related to the invention. This description first explains the data processor incorporating the pipelining system which is composed of three functional stages including an address calculation stage, an execution stage, and an operand fetch stage, respectively.

Referring now to FIG. 3, ASP, TSP, and FSP respectively denote working stage stackpointers of the address calculation stage, working stage stackpointer of the execution stage, and the working stage stackpointer of the operand fetch stage, where ASP and TSP are respectively provided with incremental and decremental functions.

ASP output latch and FSP output latch respectively retain data outputted from ASP and FSP before transferring these data to the stackpointers FSP and TSP of the following functional stage. Data buses D0, S1, S2 and A are internal buses of the data processor related to the invention. SPI, SP0 and SP1 are respectively the stackpointers of specific levels as seen from software corresponding to rings used for external interruption and protecting memory.

FIGS. 4 through 7 are respectively the schematic diagrams explaining the pipelining process of the data processor related to the invention when executing a plurality of instructions, where (a) denotes instructions and (b) the pipelining process in conjunction with the address calculation stage, operand fetch stage, and the execution stage, when executing instructions (a).

When executing instructions including the designation of the operands of the stack-push addressing mode and stack-pop addressing mode, the new stackpointer value calculated at the address calculation stage is written into the working stage stackpointer ASP corresponding to the address calculation stage. As soon as the instruction is delivered to the operand fetch stage, the value of ASP is transferred to the working stage stackpointer FSP corresponding to the operand fetch stage through the ASP output latch.

Next, when this instruction is delivered to the execution stage, the value of the working stage stackpointer FSP is transferred to the working stage stackpointer TSP corresponding to the execution stage through the FSP output latch.

For example, FIGS. 4(b) denotes the operation in which instructions I1 and I2 including stack-push are repeated twice. Assume that the value of ASP prior to the executing of instruction I1 is "SP" for example. First, assume that address "SP-4" is generated as a result of executing the instruction I1 at the address calculation stage. This address value is then written into ASP, and thus, the value of ASP becomes "SP-4". Next, as soon as the instruction I1 is delivered to the following operand fetch stage, the value of ASP is then transferred to FSP through the ASP output latch to allow, at the address calculation stage, address calculation is executed for the instruction I2. This calculation generates address "SP-8".

Next, as soon as the instruction I1 is received at the execution stage, simultaneously, address value "SP-4" of FSP is delivered to the stackpointer TSP corresponding to the execution stage through the FSP output latch. As a result, the execution stage stores the data of register O (Rg0) into stack whose stackpointer value is "SP-4" of TSP.

Since the value of TSP has been already rewritten into the value "SP-8" which was calculated when processing instruction I2 at the address calculation stage, when the instruction I2 is processed at the execution stage, the execution stage stores the data of register 1 (Rg1) into stack by activating the address value "SP-8" for constituting stackpointer.

FIG. 5 shows the case that instructions include stack-pop. First, among the instructions, the ASP value is outputted as an address to deliver to the next stage, and then the ASP is incremented. In addition, ASP is provided with the increment function, which can increment independently from the TSP at the execution stage.

Figure 6:
Figure 6:
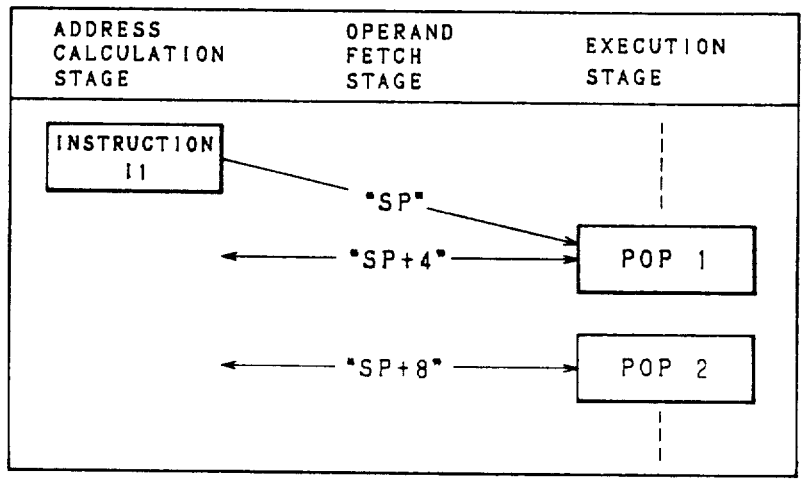
Figure 7:
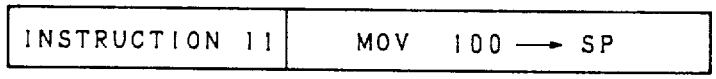
Figure 7:
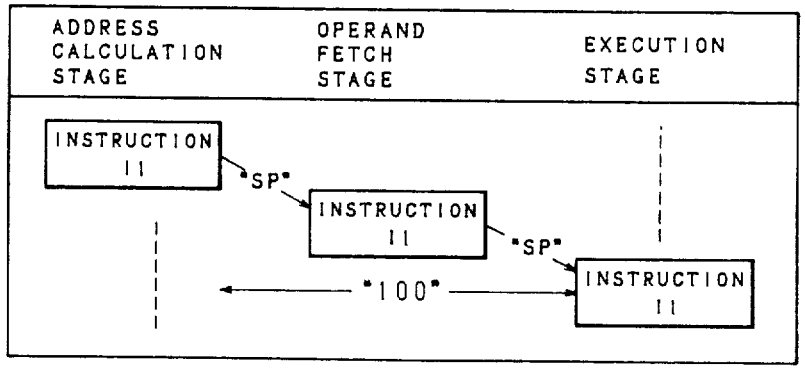

FIG. 6 is a schematic diagram denoting the case of processing the return-subroutine instruction. The execution stage extracts stacked data such as the register value, which then repeats stack-pop operations by referring to TSP. When the stack-pop operations are repeated, although addressing mode is underway, since the return subroutine instruction itself increments the stackpointer value, all the following instructions cannot access the stackpointer until the execution of the subroutine instruction is completed, and thus, all of the following instructions are obliged to stand by themselves in front of the address calculation stage. Consequently, the value of ASP becomes identical to that of TSP. This allows the execution stage to simultaneously increment the values of ASP and TSP when executing the subroutine instruction. When loading a new value into TSP in the execution stage, identical values are simultaneously loaded into TSP and ASP. If the value of TSP must be renewed at the execution stage, the values of TSP and ASP are simultaneously renewed.

FIG. 7(b) is a schematic diagram denoting the case of processing data-loading instruction on the assumption that the stack-point is a general-purpose register. In this case, data "100" designated for loading is simultaneously written into ASP and TSP through the bus DO.

When executing instructions in conjunction with SPI, SP0, and SP1, these stackpointers retain the preceding values, and at the final step of processing respective instructions, the value of TSP is set to one of stackpointers SPI, SP0, and SP1 referred from software. This allows the data processor to again execute the data processing operations by transferring the values of stackpointers of SPI, SP0, and SP1 dealing with any condition such as occurrence of interruption or change of state from ring to any other condition, to the working stage stackpointers of respective functional stages.

As is clear from the above description, according to the invention, by virtue of providing the needed functional stage of pipeline with working stage stackpointers, the data processor related to the invention securely prevents pipeline from lowering the working efficiency when processing data under the stack-push addressing mode and stack-pop addressing mode, thus eventually allowing pipeline to effectively execute data-processing operations.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bound thereof are therefore intended to be embraced by the claims.

What is claimed is:

1. A data processor having a pipelining system which is composed of a plurality of stages and which processes instructions, at least some of the instructions being processed in a first of said plurality of stages and subsequently transferred in the pipeline for processing by another of said plurality of stages also having at least one addressing mode which designates the operand of an instruction by a stackpointer said stackpointer being controllably renewable, comprising:

at least first and second working stackpointers said second working stackpointer being distinct and independent from said first working stackpointer, wherein said first working stackpointer can be independently referenced by said first of said plurality of stages and said second working stackpointer can be independently referenced by a second of said plurality of stages;

means for storing operands into a stack, said stack utilizing said first and second working stackpointers;

means for transferring the value stored in said first working stackpointer to said second working stackpointer, said transferring being synchronized with said, transfer of an instruction so that the second working stackpointer points to an operand previously referenced by said first working stackpointer; and control means which renews said first working stackpointer and second working stackpointer.

2. A data processor as set forth in claim 1, wherein a first and second of said plurality of stages are an address calculation stage and an execution stage, respectively.

3. A method for executing instructions in a data processor having a pipelining system which is composed of a plurality of stages, each stage for performing a portion of the processing of instructions, the processing of at least one instruction being movable from a first of said plurality of stages, to another of said plurality of stages, said at least one instruction for by using a stackpointer to designate an operand in a plurality of operands in a stack, the method comprising:

providing a first renewable working stackpointer which can be referenced by a first address calculation stage of said pipelining system;

providing a second renewable working stackpointer which can be referenced by a second execution stage of said pipelining system;

said second renewable working stackpointer being independent and distinct from said first renewable working stackpointer;

providing said one instruction to said address calculation stage;

renewing said first renewable working stackpointer;

said first renewable working stackpointer pointing to the operand of said one instruction;

transferring data stored in said first renewable working stackpointer into said second renewable working stackpointer such that said second renewable working stackpointer points to said operand of said one instruction, said transferring being synchronized with moving the processing for said instruction from said address calculation stage to said execution stage; and referencing said second renewable working stackpointer during said second execution stage to execute said instruction.

4. A method, as claimed in claim 3, further comprising:

providing a second instruction for renewing a stackpointer to said address calculation stage; and renewing said first and said second stackpointers simultaneously.

* * * * *